(12) United States Patent
Otsuka et al.

(10) Patent No.: US 7,447,427 B2
(45) Date of Patent: Nov. 4, 2008

(54) DIGITAL CAMERA IMAGE DISPLAY APPARATUS AND DIGITAL CAMERA PROVIDED WITH THE APPARATUS

(75) Inventors: Koichi Otsuka, Higashimurayama (JP); Ippei Yamauchi, Tokorozawa (JP); Akira Suzuki, Akishima (JP); Motohiro Takeda, Akiruno (JP); Kazuhiko Kanda, Hino (JP)

(73) Assignee: Casio Computer Co., Ltd., Tokyo (JP)

( * ) Notice: Subject to any disclaimer, the term of this patent is extended or adjusted under 35 U.S.C. 154(b) by 674 days.

(21) Appl. No.: 11/158,988

(22) Filed: Jun. 22, 2005

(65) Prior Publication Data

US 2005/0286884 A1 Dec. 29, 2005

(30) Foreign Application Priority Data

Jun. 25, 2004 (JP) ............................. 2004-187845

(51) Int. Cl.
*G03B 17/18* (2006.01)
(52) U.S. Cl. ...................... 396/287; 396/374; 396/439
(58) Field of Classification Search ................ 396/287, 396/429, 439, 373, 374, 535
See application file for complete search history.

(56) References Cited

U.S. PATENT DOCUMENTS 6,700,621 B1 * 3/2004 Seo ............................. 348/375

2001/0020980 A1 * 9/2001 Misawa ....................... 348/375

FOREIGN PATENT DOCUMENTS

| CN | 1466009 A | 1/2004 |
|----|-----------|--------|
| JP | 10-191114 A | 7/1998 |
| JP | 11-160787 A | 6/1999 |
| JP | 2000-350065 A | 12/2000 |

OTHER PUBLICATIONS

Chinese Office Action (and English translation thereof) dated Feb. 15, 2008, issued in a counterpart Chinese Application.

* cited by examiner

*Primary Examiner*—Christopher E. Mahoney
*Assistant Examiner*—Warren K Fenwick
(74) *Attorney, Agent, or Firm*—Frishauf, Holtz, Goodman & Chick, P.C.

(57) ABSTRACT

A digital camera includes an imaging unit provided in a camera body to take an image electrically, an optical finder provided at an edge portion of the body, and a display apparatus provided in the body to display the taken image. The display apparatus includes a panel including a display area arranged nearer to a rear surface of the body than the imaging unit in the body, a projection projecting outwardly from a part of a periphery of the display area, a looking-out portion at a predetermined part of the projection, and a pixel drive unit for driving matrix pixels of the display area at the remaining part of the projection. In the body, the area of the panel corresponds to a window formed in the rear surface, the looking-out portion of the projection overlaps with the finder, and the drive unit is arranged in a side of the finder.

20 Claims, 11 Drawing Sheets

DIGITAL CAMERA IMAGE DISPLAY APPARATUS AND DIGITAL CAMERA PROVIDED WITH THE APPARATUS

CROSS-REFERENCE TO RELATED APPLICATIONS

This application is based upon and claims the benefit of priority from prior Japanese Patent Application No. 2004-187845, filed Jun. 25, 2004, the entire contents of which are incorporated herein by reference.

BACKGROUND OF THE INVENTION

1. Field of the Invention

The present invention relates to an image display apparatus mounted on a digital camera, and a digital camera provided with this image display apparatus.

2. Description of the Related Art

Each of most digital cameras in which an image is electrically taken through an imaging unit has an optical finder and an image display apparatus (monitor) which displays the image taken through the imaging unit. And, the digital camera includes imaging lenses provided in a camera main body and a charge-coupled-device provided to face the imaging lenses in the camera main body.

The optical finder includes a finder object window and an eyepiece window, which are provided in front and rear surfaces of the camera main body, and a finder optical system which is provided in the camera main body and has one end facing the finder object window and the other end facing the eyepiece window. Usually, the optical finder is arranged at an upper edge portion of the camera main body in consideration of the easiness of viewing the eyepiece window while the camera is held by a user.

The image display apparatus comprises a display panel, such as a liquid crystal display panel. The display panel includes a display area in which a plurality of pixels are arranged in a matrix, a projection which projects upwards or downwards from an upper edge or lower edge of an outer periphery of the display area, and a pixel drive unit which is mounted on the projection. In the field of the digital camera two types of image display apparatuses are used, one of which is a fixed type and another of which is a movable type.

In a digital camera disclosed in, e.g., Japanese Patent Application KOKAI Publication No. 11-160787, and comprising a fixed type image display apparatus, a monitor opening is provided below an eyepiece window of an optical finder on a rear surface of a camera main body, and an image display apparatus is arranged below the optical finder in the camera main body. The image display apparatus exposes a display area of its display panel to the outside of the camera main body through the monitor opening in the rear surface of the camera main body.

In a digital camera disclosed in, e.g., Japanese Patent Application KOKAI Publication No. 10-191114, and comprising a movable type image display apparatus, the image display apparatus is provided on a rear surface of a camera main body in such a manner that this apparatus can slide in up-and-down directions. The movable type image display apparatus is arranged at an upper end position when the optical finder is not used, and the display apparatus is arranged at a lower end position when the optical finder is used. The movable type image display apparatus arranged at the upper end position covers an eyepiece window of an optical finder, and the display apparatus arranged at the lower end position is moved from and exposes the eyepiece window. The movable type image display apparatus projects its lower end portion downwards from the camera main body.

In the field of the digital camera, it is desired to make the display area of the image display apparatus being as large as possible so that a user can easily view a monitored image displayed on the display area.

However, in the conventional display panel including the projection projecting upwards or downwards from the upper edge or lower edge of the display area as described above, a dimension of the display area in the up-and-down directions is reduced by an amount corresponding to a dimension of the projection in the up-and-down directions as compared with a dimension of the entire display panel in the up-and-down directions.

Therefore, in the conventional digital camera comprising the fixed type image display apparatus and structured as described above, the dimension of the entire display panel in the up-and-down directions is restricted to be within the dimension of a part of the camera main body below the optical finder, and hence the dimension of the display area in the up-and-down directions is restricted to be smaller than the dimension of the part of the camera main body below the optical finder in the up-and-down directions.

On the contrary, in the conventional digital camera comprising the movable type image display apparatus and structured as described above, the dimension of the entire display panel in the up-and-down directions can be increased to match with the dimension of the rear surface of the camera main body in the up-and-down directions. Therefore, as compared with the digital camera comprising the fixed type image display apparatus, the digital camera comprising the movable type image display apparatus can use the display panel having a larger dimension in the up-and-down directions, and hence the display panel can have the display area having a larger dimension in the up-and-down directions.

However, in the digital camera comprising the movable type image display apparatus, a structure for making the movable type image display apparatus being slidable on the rear surface of the camera main body is complicated, and its manufacturing cost is high. Furthermore, in the digital camera comprising the movable type image display apparatus, the display panel of the image display apparatus must be slid in the up-and-down directions in accordance with use or nonuse of the optical finder, and hence it makes the utilization of the digital camera being troublesome.

BRIEF SUMMARY OF THE INVENTION

According to one aspect of the invention, an image display apparatus which is provided in a camera main body of a digital camera, the camera main body having an optical finder, to display an image taken by the digital camera, comprises a display panel including: a display area in which a plurality of pixels are arranged in a matrix; a projection which projects outwardly from at least a part of an outer periphery of the display area; a lookout enabling portion which is arranged at a predetermined part of the projection and enables lookout from one of both sides of the projection to the other side; and a pixel drive unit which is arranged at the remaining part of the projection.

When the image display apparatus is provided in the camera main body, the lookout enabling portion at the predetermined part of the projection of the display panel overlaps with the optical finder, and the pixel drive unit at the remaining part of the projection is arranged in a side of the optical finder.

According to another aspect of the invention, a digital camera comprises: a camera main body which has a front surface, a rear surface, an edge portion, and an image display window formed on the rear surface; an imaging unit which is provided in the camera main body and electrically takes an image; an optical finder which is provided at the edge portion of the camera main body; and an image display apparatus which is provided in the camera main body and displays an image taken by the imaging unit.

The image display apparatus includes a display panel including: a display area which is arranged nearer to the rear surface than the imaging unit in the camera main body and in which a plurality of pixels are arranged in a matrix; a projection which projects outwardly from at least a part of an outer periphery of the display area; a lookout enabling portion which is arranged at a predetermined part of the projection and enables lookout from one of both sides of the projection to the other side; and a pixel drive unit which is arranged at the remaining part of the projection.

When the image display apparatus is arranged in the camera main body, the display area of the display panel corresponds to the image display window, the lookout enabling portion at the predetermined part of the projection of the display panel overlaps with the optical finder, and the pixel drive unit at the remaining part of the projection is arranged in a side of the optical finder.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

A digital camera according to a first embodiment of the present invention will be described in detail with reference to FIGS. 1 to 8.

Figure 1:
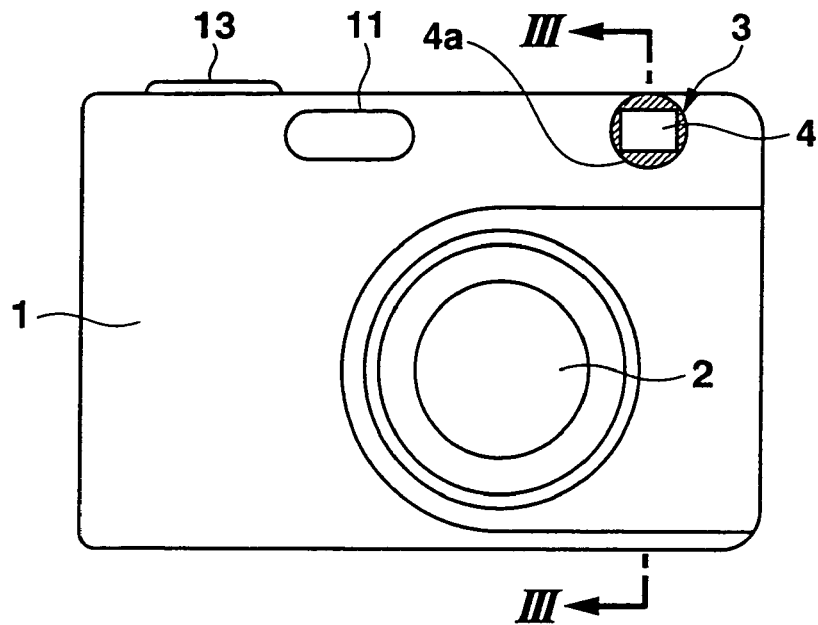
FIG. 1 is a front view of a digital camera according to a first embodiment of the present invention.
Figure 2:
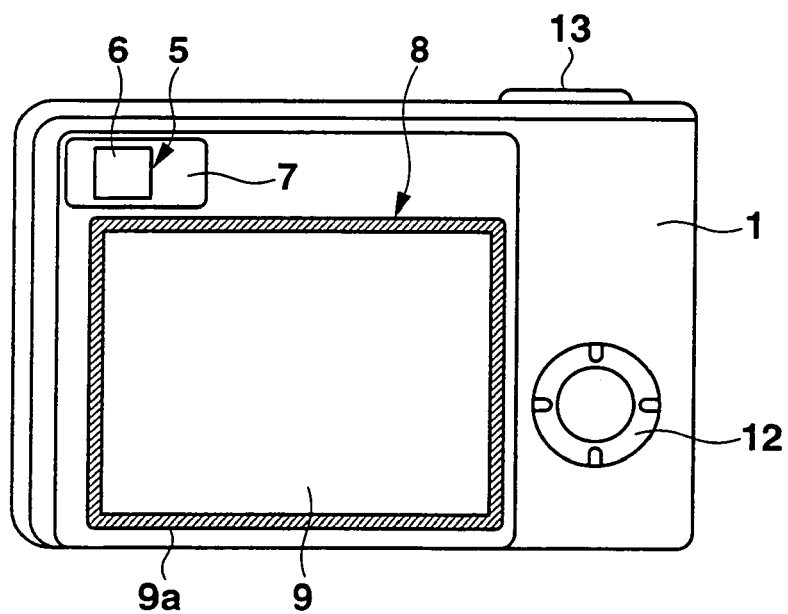
FIG. 2 is a rear view of the digital camera shown in FIG. 1.
Figure 3:
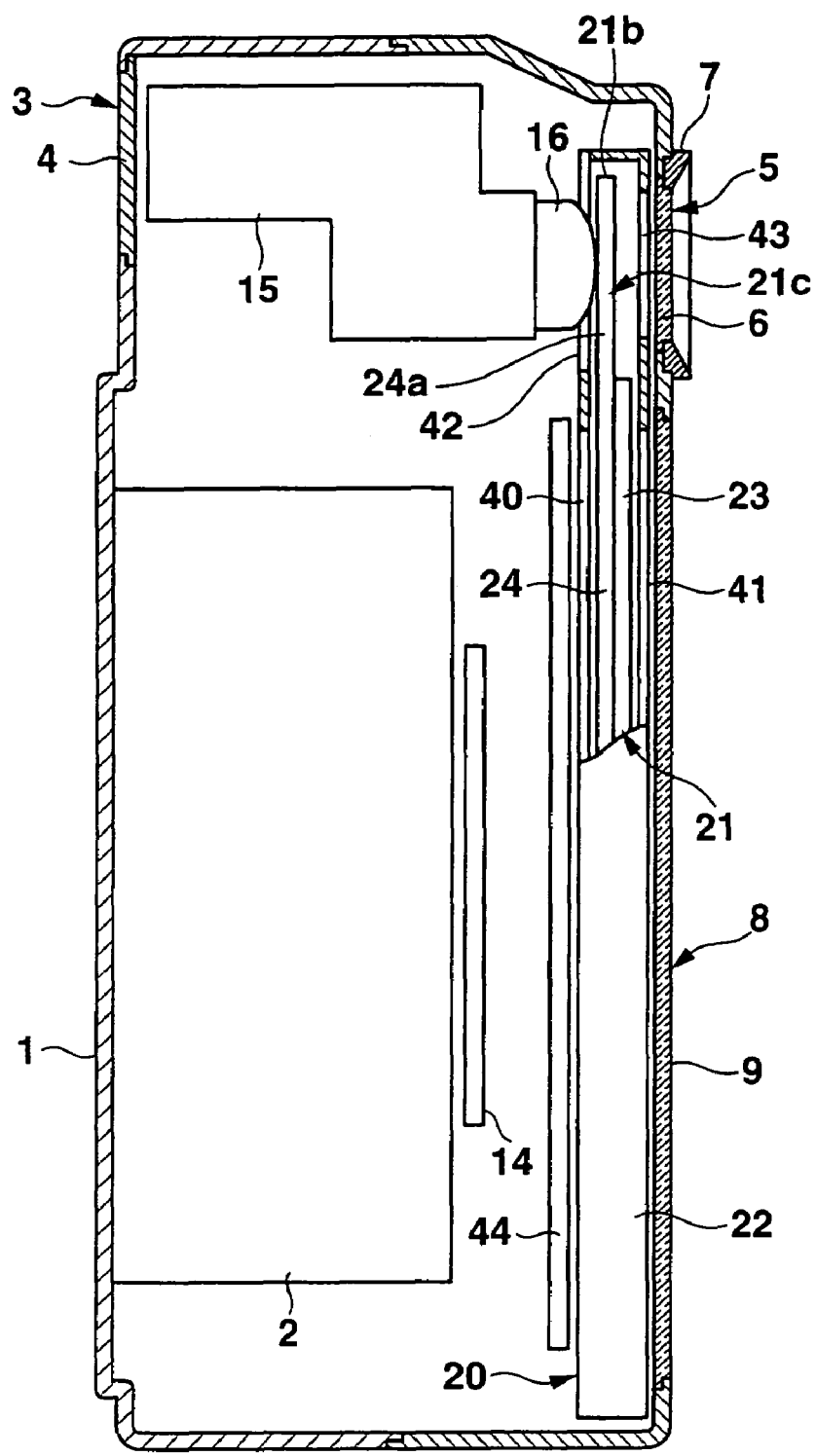
FIG. 3 is a cross-sectional view taken along a line III-III in FIG. 1.
Figure 4:
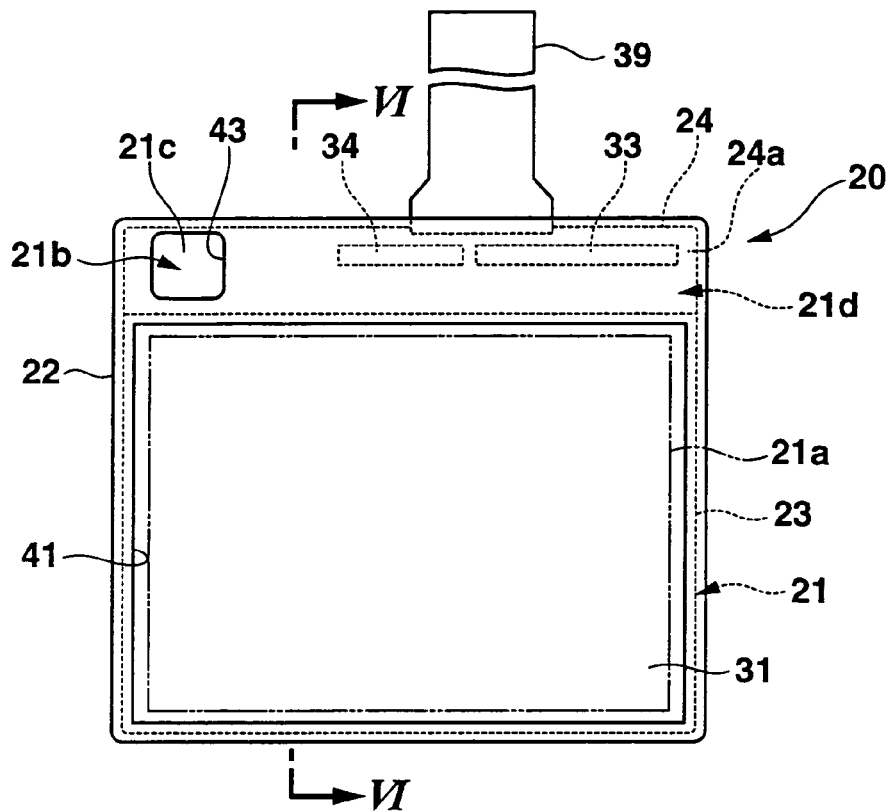
FIG. 4 is a rear view of an image display apparatus used in the digital camera shown in FIG. 1.
Figure 5:
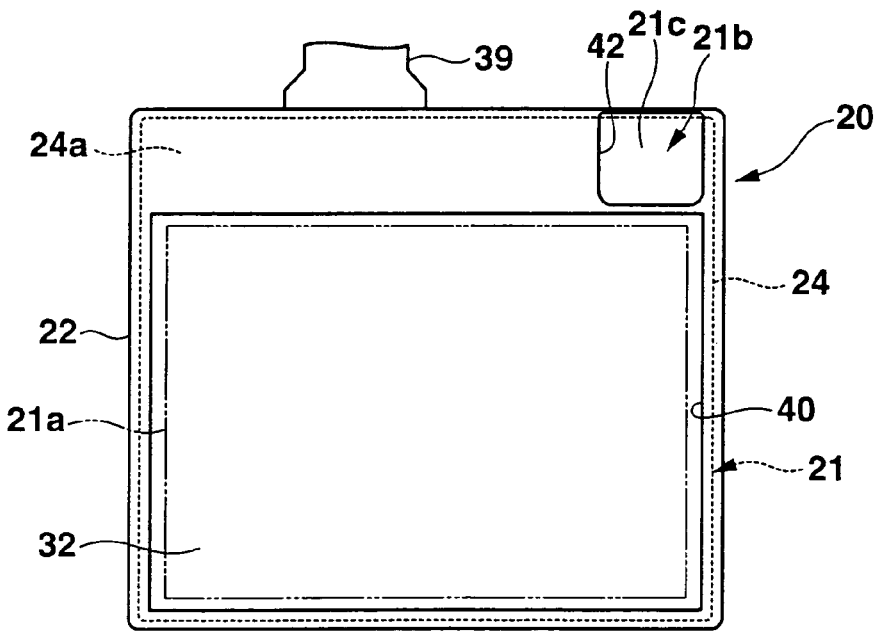
FIG. 5 is a front view of the image display apparatus shown in FIG. 4.
Figure 6:
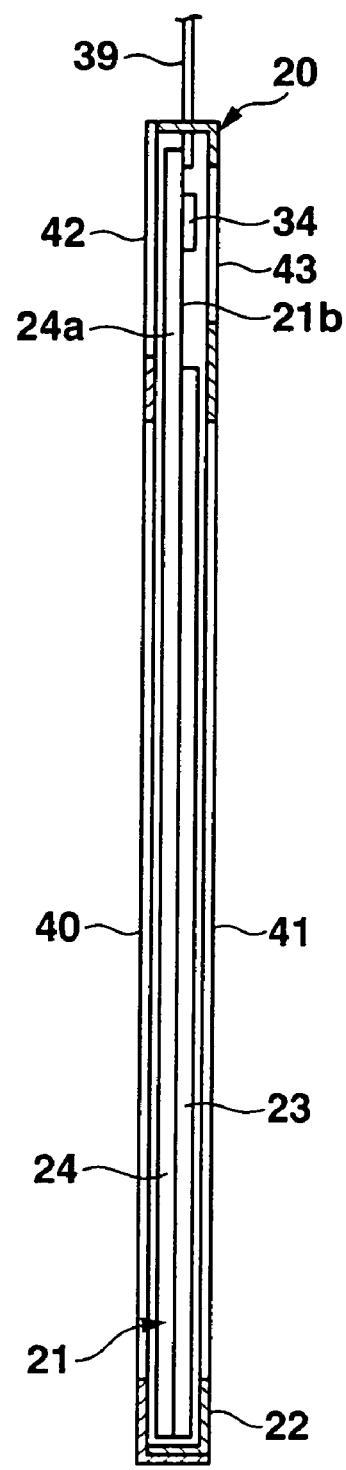
FIG. 6 is a cross-sectional view taken along a line VI-VI in FIG. 4.
Figure 7:
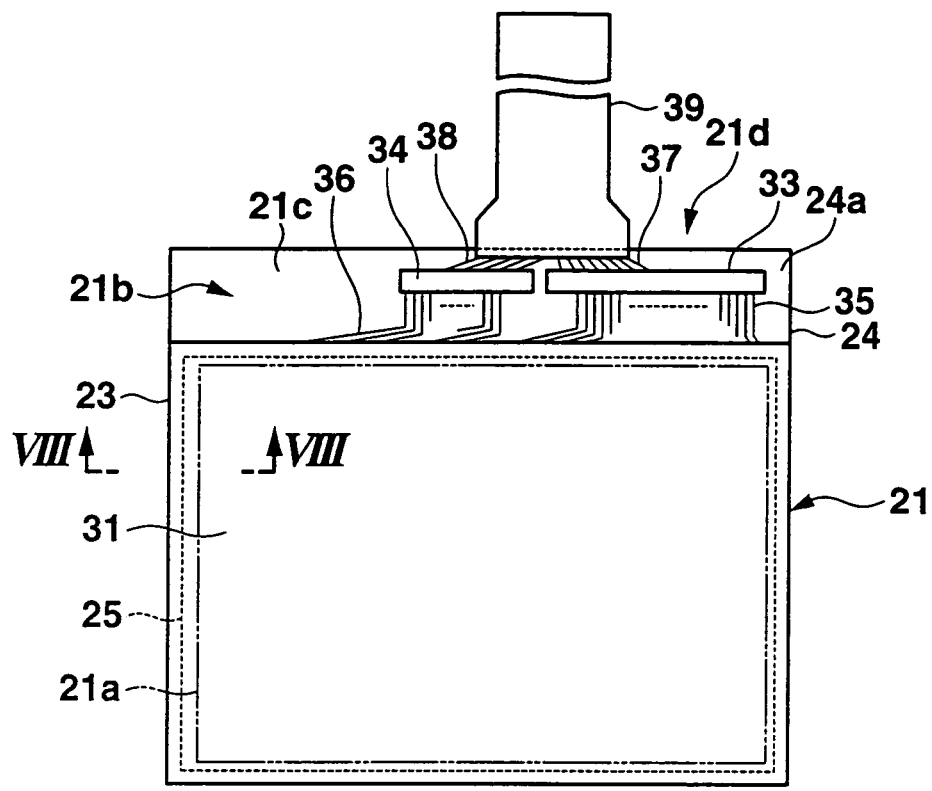
FIG. 7 is a rear view of a display panel of the image display apparatus shown in FIG. 4.
Figure 8:
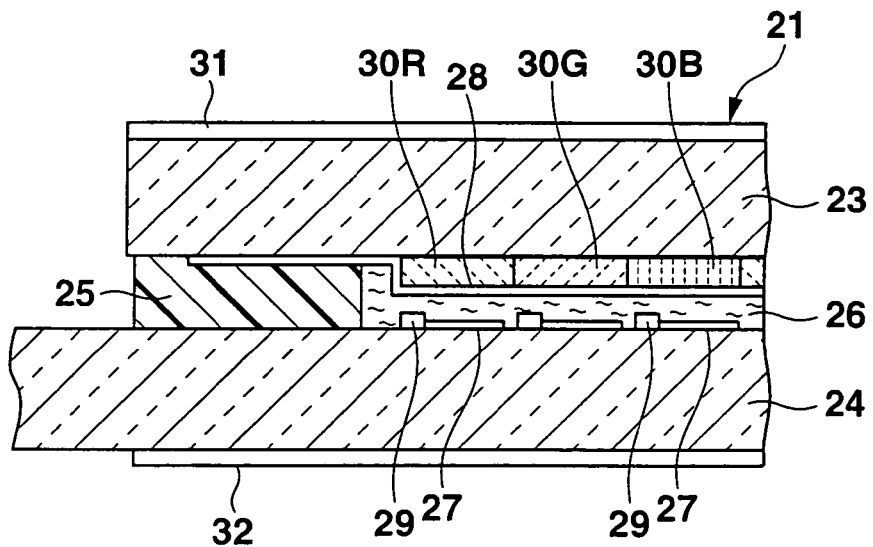
FIG. 8 is a cross-sectional view of the display panel taken along a line VIII-VIII shown in FIG. 7.

This digital camera is of an imaging lens retractable type, and includes a camera main body 1 having a rectangular case as shown in FIGS. 1 to 3. In the rectangular case, a width in right-and-left directions is set to 87 mm, a height is set to 57 mm and a thickness between front and rear surfaces is set to 23 mm, for example.

An imaging lens 2 is retractably provided on the front surface of the camera main body 1. The imaging lens 2 is retracted into the camera main body 1 when it is not used for taking an object, and is projected forward from the front surface of the camera main body 1 when it is used for taking the object.

The imaging lens 2 is configured as a known zoom lens.

A finder object window 3 is formed at a right corner in an upper end portion of the front surface of the camera main body 1, and the finder object window 3 is covered with a transparent cover member 4. A finder frame mask 4a which restricts a visual field of the finder is formed on the cover member 4.

An eyepiece window 5 is formed at a left corner in an upper end portion of the rear surface of the camera main body 1, and the eyepiece window 5 is covered with a transparent cover member 6. An eyepiece window frame member 7 which surrounds the eyepiece window 5 is provided on the rear surface, and the eyepiece window frame member 7 is configured by a light shielding mask.

An image display window 8 is formed below the eyepiece window 5 in the rear surface of the camera main body 1, and the image display window 8 is covered with a transparent cover member 9. An image display window frame member 9a which restricts an image display area on the image display window 8 is provided on the cover member 9, and the image display window frame member 9a is configured by a light shielding mask.

An electronic flash window 11 is formed at the upper end portion in the front surface of the camera main body 1 on the side which is opposite to the finder object window 3 with respect to the imaging lens 2. A non-illustrated known electronic flash unit is arranged at a position corresponding to the electronic flash window 11 in the camera main body 1.

A mode selecting key 12 for selecting and setting various operating modes in the digital camera is provided in the right side of the image display window 8 on the rear surface of the camera main body 1.

A shutter button 13 is provided at a right corner portion on an upper surface of the camera main body 1.

A main switch, a zooming key for operating a zooming of the imaging lens 2, a recording medium insertion slot into which a recording medium for exchanging electronic information with an electronic circuit in the digital camera can be inserted, a connector insertion slot into which a connector of an external connection unit for connecting the electronic circuit in the digital camera with an external electronic device including, e.g., a personal computer is inserted, and others are further provided on the outer surface of the camera main body 1. However, all of them have known configurations, and they are not illustrated to simplify the drawings.

In an internal space of the camera main body 1, a charge coupled device 14 is arranged in the vicinity of an inner end of the imaging lens 2. In this embodiment, a combination of the imaging lens 2 and the charge coupled device 14 constitutes an imaging unit which takes an image electrically.

An optical finder is arranged at an upper end portion in the camera main body 1. The optical finder includes a finder optical system 15 which has one end facing the finder object window 3 and the other end 16 facing the eyepiece window 5. The finder optical system 15 is configured to change a visual field of the optical finder in accordance with the zooming of the imaging lens 2.

An image display apparatus 20 for displaying an image taken by the imaging unit is further provided in the internal space of the camera main body 1.

As shown in FIGS. 3 to 8, the image display apparatus 20 includes a display panel 21 which is arranged nearer to the rear surface than the imaging unit in the internal space of the camera main body 1, and a panel case 22 which accommodates the display panel 21.

The display panel 21 has a display area 21a in which a plurality of pixels are arranged in a matrix and which corresponds to the image display window 8 in the rear surface of the camera main body 1.

In this embodiment, the display panel 21 is configured by a liquid crystal display panel. The liquid crystal display panel includes: a pair of transparent substrates 23, 24 arranged to face each other; a frame-like sealing member 25 which surrounds and seals a gap between the pair of transparent substrates 23, 24 to correspond to an outer periphery of the display area 21a; a liquid crystal layer 26 which is provided in a sealed area surrounded by the frame-like sealing member 25 corresponding to the outer periphery of the display area 21a in the gap between the pair of transparent substrates 23, 24; and a plurality of electrodes 27, 28 which are arranged at parts on inner surfaces of the pair of transparent substrates 23, 24 corresponding to the display area 21a to face each other and to operate liquid crystals provided therebetween as a plurality of pixels arranged in a matrix.

In detail, the display panel 21 in this embodiment is configured by an active matrix drive type liquid crystal display panel. Therefore, the plurality of electrodes 27 are arranged in a matrix at a part corresponding to the display area 21a on the inner surface of one transparent substrate 24 to provide a plurality of pixel electrodes, and a plurality of TFTs (thin film transistors) 29 are formed at the part on the inner surface of one transparent substrate 24 to correspond to the plurality of electrodes 27. At a part corresponding to the display area 21a on the inner surface of the other transparent substrate 23, color filters 30R, 30B, and 30B of red, green, and blue are formed to face respectively the plurality of pixel electrodes 27 on the inner surface of one transparent substrate 24. On the inner surface of the other transparent substrate 23, one film-like electrode 28 is further arranged to cover these color filters 30R, 30G and 30B and functions as a common opposed electrode.

Each TFT 29 has a non-illustrated gate electrode formed on the inner surface of one transparent substrate 24, a non-illustrated transparent gate insulating film formed on the entire inner surface of one transparent substrate 24 to cover the gate electrode, a non-illustrated i-type semiconductor film formed on the gate insulating film to face the gate electrode, and a non-illustrated source electrode and drain electrode formed to be laminated on both side surfaces of the i-type semiconductor film through an n-type semiconductor film.

The plurality of pixel electrodes 27 are formed on the non-illustrated transparent gate insulating film, and each pixel electrode 27 is connected the source electrode of the TFT 29 corresponding thereto. A non-illustrated gate wiring is formed along each of a plurality of rows of the plurality of pixel electrodes 27 on the inner surface of one transparent substrate 24, and each non-illustrated gate wiring is electrically connected to the gate electrodes of the plurality of TFTs 29 corresponding to the row of the plurality of pixel electrodes 27 which is along each non-illustrated gate wiring. A non-illustrated data wiring is formed along each of a plurality of columns of the plurality of pixel electrodes 27 on the non-illustrated transparent gate insulating film on the inner surface of one transparent substrate 24, and each non-illustrated data wiring is electrically connected to the drain electrodes of the plurality of TFTs 29 corresponding to each column of the plurality of pixel electrodes 27 which is along each non-illustrated data wiring.

At the part corresponding to the display area 21a on the inner surfaces of the pair of transparent substrates 23, 24, a non-illustrated orientation film is further provided to cover the plurality of pixel electrodes 27 and the common opposed electrode 28. The non-illustrated orientation film orients molecular axes of the liquid crystal in a predetermined direction while each of the plurality of pixel electrodes 27 is not applied with electric current.

Polarizing plates 31, 32 are arranged on outer surfaces of the pair of transparent substrates 23, 24 with transmission axes thereof being set in a predetermined direction.

It is noted that the active matrix drive type liquid crystal display panel of the display panel 21 of this embodiment can be of a TN (twisted nematic) type or a homogenous orientation type.

The display panel 21 includes a projection 21b which projects outwardly from at least a part of the outer periphery of the display area 21a, a lookout enabling portion 21c which is arranged at a predetermined part of the projection 21b and enables lookout from one of both sides of the projection 21b to the other side, and a pixel drive unit 21d which is arranged at the remaining part of the projection 21b.

In this embodiment, each of the pair of transparent substrates 23, 24 has a rectangular shape. And, one transparent substrate 24 in which the plurality of pixel electrodes 27 and the plurality of TFTs 29 are formed at the part of the inner surface thereof corresponding to the display area 21a has a larger dimension in the up-and-down directions than that of the other transparent substrate 23, and an upper edge portion 24a of one transparent substrate 24 projects upward more than an upper edge of the other transparent substrate 23. The upper edge portion of one transparent substrate 24 provides the projection 21b of the display panel 21.

In this embodiment, a predetermined part of the upper edge portion 24a of one transparent substrate 24 provides the lookout enabling portion 21c at the predetermined part of the projection 21b of the display panel 21. This means that the lookout enabling portion 21c includes a transparent material of one transparent substrate 24.

The pixel drive unit 21d of the display panel 21 includes two drive elements 33, 34 arranged on the remaining part of the upper edge portion 24a of one transparent substrate 24. One drive element 33 is an LSI (Large Scale Integrated circuit) which is configured as a scanning drive element for supplying gate signals (scanning signals) to the non-illustrated gate wirings formed on the inner surface of one transparent substrate 24 as described above. And, the other drive element 34 is an LSI (Large Scale Integrated circuit) which is configured as a data writing drive element for supplying image data signals to the non-illustrate data wirings formed on the inner surface of one transparent substrate 24 as described above.

On the remaining part of the projection 21*b* of the display panel 21, i.e., on the remaining part of the upper edge portion 24*a* of one transparent substrate 24, a plurality of scanning drive element connection leads 35 and a plurality of data writing drive element connection leads 36 are formed. The scanning drive element connection leads 35 connect the plurality of non-illustrated gate wirings formed as described above with a plurality of output terminals of the scanning drive element 33, and the data writing drive element connection leads 36 connect the plurality of non-illustrate data wirings formed as described above with a plurality of output terminals of the data writing drive element 34 are formed.

Further, on the remaining part of the projection 21*b* of the display panel 21, i.e., on the remaining part of the upper edge portion 24*a* of one transparent substrate 24, a plurality of drive element input leads 37 connected with a plurality of input terminals of the scanning drive element 33 and a plurality of data writing drive element input leads 38 connected with a plurality of input terminals of the data writing drive element 34 are formed. The drive element input leads 37 and the data writing drive element input leads 38 are further connected with a plurality of wirings of a flexible wiring board 39 through which the scanning drive element 33 and the data write drive element 34 are connected with a non-illustrated electric circuit in the internal space of the camera main body 1.

The panel case 22 is formed of a metal plate, and includes a light receiving opening 40 formed to expose a part corresponding to the display area 21*a* in one transparent substrate 24 of the display panel 21, a display area opening 41 formed to expose a part corresponding to the display area 21*a* in the other transparent substrate 23 of the display panel 21, and lookout enabling portion openings 42 and 43 formed to expose the both surfaces of the lookout enabling portion 21*c* at the predetermined part of the projection 21*b* of the display panel 21, i.e., at the predetermined part of the upper edge portion 24*a* of one transparent substrate 24. Further, a non-illustrated flexible wiring board insertion opening is formed in the panel case 22 to allow the flexible wiring board 39 extending from the projection 21*b* of the display panel 21 to pass through the panel case 22.

Each of the light receiving opening 40 and the display area opening 41 both of which correspond to the display area 21*a* has a dimension slightly larger than the dimension of the display area 21*a*.

In the internal space of the camera main body 1, the display panel 21 of the image display apparatus 20, together with the panel case 22, is arranged nearer to the rear surface of the camera main body 1 than the charge coupled device 14 which is a part of the imaging unit. And, the display area opening 41 in the rear surface of the panel case 22 is arranged near to the transparent cover member 9 of the image display window 8 in the rear surface of the camera main body 1, the lookout enabling portion opening 43 in the rear surface of the panel case 22 is arranged near to the transparent cover member 6 of the eyepiece window 5 in the rear surface of the camera main body 1, and the other end 16 of the finder optical system 15 is inserted into the lookout enabling portion opening 42 in the front surface of the panel case 22.

As a result, in the display panel 21 in the panel case 22, the display area 21*a* faces the transparent cover member 9 of the image display window 8 in the rear surface of the camera main body 1 through the display area opening 41 of the panel case 22, and the outer periphery of the display area 21*a* is surrounded by the image display window frame member 9*a* provided on the cover member 9. Additionally, the lookout enabling portion 21*c* at the predetermined part of the projection 21*b* faces the other end 16 of the finder optical system 15 through the lookout enabling portion opening 42 in the front surface of the panel case 22, and further faces the transparent cover member 6 of the eyepiece window 5 in the rear surface of the camera main body 1 through the lookout enabling portion opening 43 in the rear surface of the panel case 22. This means that the lookout enabling portion 21*c* at the predetermined part of the projection 21*b* of the display panel 21 overlaps with the finder optical system 15 of the optical finder. And, the pixel drive unit 21*d* at the other part of the projection 21*b* of the display panel 21 is arranged in a side of the finder optical system 15 of the optical finder.

In the internal space of the camera main body 1, a surface emitting unit 44 is provided to face the light receiving opening 40 in the rear surface of the panel case 22 of the image display apparatus 20. The surface emitting unit 44 emits and projects light toward the display area 21*a* of the display panel 21 through the light receiving opening 40 in the rear surface of the panel case 22.

The non-illuminated electric circuit provided in the internal space of the camera main body 1 includes, e.g., an image taking control circuit for controlling an electrical taking of an image by the imaging unit, an image data processing circuit for performing data processing of the image electrically taken by the imaging unit, and an image data output circuit for outputting image data processed by the image data processing circuit, and the flexible wiring board 39 extending from the pixel drive unit 21*d* of the projection 21*b* of the display panel 21 is connected to the image data output circuit.

As apparent from the above detailed explanation, in the digital camera of this embodiment, the display panel 21 provided in the image display apparatus 20 which is arranged in the camera main body 1 and which displays the image taken by the digital camera includes the display area 21*a* in which a plurality of pixels are arranged in a matrix, the projection 21*b* projecting outwardly from at least a part of the outer periphery of the display area 21*a*, the lookout enabling portion 21*c* arranged at the predetermined part of the projection 21*b* and enabling the lookout from one of the both sides of the projection 21*b* to the other side, and the pixel drive unit 21*d* arranged at the remaining part of the projection 21*b*.

And, when the image display apparatus 20 is provided in the camera main body 1, the lookout enabling portion 21*c* at the predetermined part of the projection 21*b* of the display panel 21 overlaps with the optical finder of the camera main body 1, and the pixel drive unit 21*d* at the remaining part of the projection 21*b* is arranged in the side of the optical finder.

In more detail, the display panel 21 is the liquid crystal display panel, and the upper edge portion 24*a* which is the part projecting outwardly from at least a part of the outer periphery of the display area 21*a* in one transparent substrate 24 of the pair of transparent substrates 23, 24 of the liquid crystal display panel 21 provides the projection 21*a*. Further, the transparent material at the predetermined part of the upper edge portion 24*a* providing the projection 21*a* in one transparent substrate 24 provides the lookout enabling portion 21*c*.

The display panel 21 is arranged nearer to the rear surface of the camera main body 1 than the charge coupled device 14 included in the imaging unit of the camera main body 1, and the lookout enabling portion 21*c* of the upper edge portion 24*a* is interposed between the eyepiece window 5 in the upper end portion of the rear surface of the camera main body 1 and the other end 16 facing the eyepiece window 5 in the finder optical system 15 included in the optical finder while the display area 21a is faced to the image display window 8 in the rear surface of the camera main body 1.

Therefore, the dimension of the image display window 8 in the up-and-down directions (i.e., the dimension of the display area 21a of the display panel 21 of the image display apparatus 20 in the up-and-down directions) in the rear surface of the camera main body 1 can be set from the vicinity of the lower end of the rear surface to the vicinity of the lower edge of the eyepiece window 5.

Concretely, in the rear surface of the camera main body 1 having the width of 87 mm in the right-and-left directions and the height of 57 mm as described above, a diagonal length of the image display window 8 (i.e., a diagonal length of the display area 21a of the display panel 21 of the image display apparatus 20) can be set to 63.5 mm (2.5 inch).

On the contrary, in a digital camera using a conventional display panel in which a lookout enabling portion is not provided in a projection projecting outwardly from at least a part of an outer periphery of a display area and being provided with a pixel drive unit, a diagonal length of an image display window (i.e., a diagonal length of a display area of the display panel of the image display apparatus) can merely be set to 50.8 mm (2 inches) at maximum in the rear surface of the camera main body having the width of 87 mm in the right-and-left directions and the height of 57 mm as described above.

Furthermore, the display panel 21 of the image display apparatus 20 used in the digital camera of the embodiment is accommodated in the panel case 22 including the display area opening 41 which corresponds to the display area 21a of the display panel 21 and exposes the display area 21a and the lookout enabling portion openings 42, 43 which correspond to the lookout enabling portion 21c of the projection 21b of the display panel 21 and expose the lookout enabling portion 21c. Such a panel case 22 facilitates the handling of the display panel 21 of the image display apparatus 20, and hence facilitates the assembling work of the display panel 21 of the image display apparatus 20 into the internal space of the camera main body 1.

Moreover, the other end 16 of the finder optical system 15, corresponding to the eyepiece window 6 in the rear surface of the camera main body 1, is inserted into the lookout enabling portion opening 42 of the panel case 22, facing the other end 16 of the finder optical system 15. As a result, the use of the panel case 22 does not increase the thickness of the camera main body 1 in the back-and-forth directions.

Second Embodiment

Now, a digital camera according to a second embodiment of the present invention will be described with reference to FIG. 9.

A most part of a configuration of the digital camera according to the second embodiment is the same as the most part of the configuration of the digital camera according to the first embodiment of the present invention mentioned above with reference to FIGS. 1 to 8.

Therefore, in the digital camera according to the second embodiment, the structural elements which are the same as those in the digital camera according to the first embodiment are denoted by the same reference numerals as those denoting the structural elements in the digital camera according to the first embodiment corresponding to the structural elements in the digital camera according to the second embodiment, thereby eliminating the detailed explanations of such structural elements.

Figure 9:
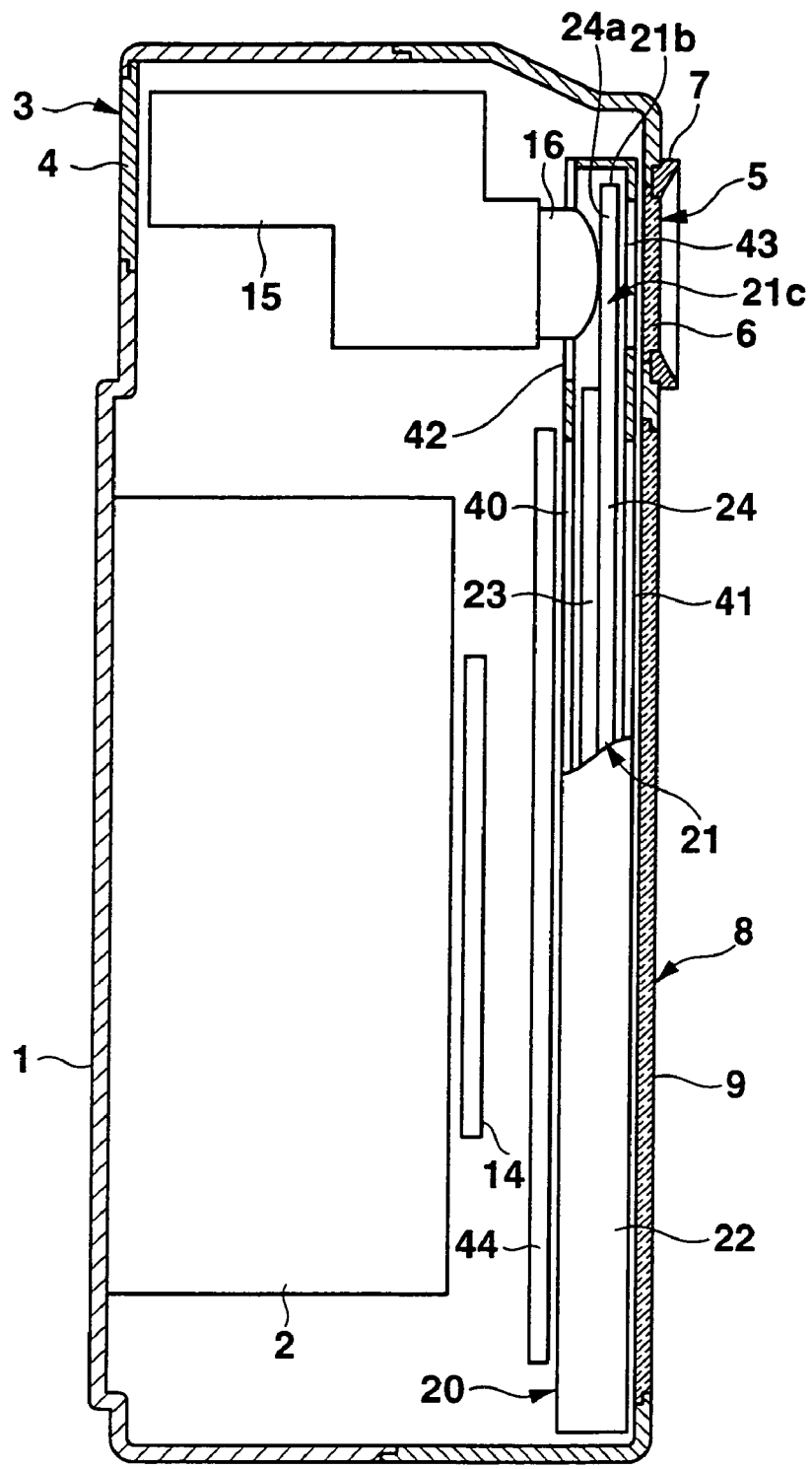
FIG. 9 is a cross-sectional view of a digital camera according to a second embodiment of the present invention.

A cross section of the digital camera according to the second embodiment shown in FIG. 9 corresponds to the cross section of the digital camera according to the first embodiment shown in FIG. 3.

The digital camera according to the second embodiment is different from the digital camera according to the first embodiment in the arrangement of the display panel 21 in the panel case 22.

In detail, in the digital camera according to the second embodiment shown in FIG. 9, one transparent substrate 23 of the display panel 21 in the panel case 22 faces the light receiving opening 40 in the front surface of the panel case 22, and the other transparent substrate 24 having the upper edge portion 24a providing the projection 21a faces the display area opening 41 in the rear surface of the panel case 22.

As apparent from the comparison between the cross section of the digital camera according to the second embodiment shown in FIG. 9 and the cross section of the digital camera according to the first embodiment shown in FIG. 3, the other end 16 of the finder optical system 15 facing the lookout enabling portion opening 42 in the front surface of the panel case 22 can be further deeply inserted into the lookout enabling portion opening 42 in the front surface of the panel case 22 by a distance substantially corresponding to a thickness of one transparent substrate 23, due to such an arrangement of the display panel 21 in the panel case 22 of the digital camera according to the second embodiment.

This means that a dimension (a thickness) of the camera main body 1 in the back-and-forth directions in the digital camera according to the second embodiment shown in FIG. 9 can be reduced by at least an amount corresponding to the above-described distance as compared with a dimension (a thickness) of the camera main body 1 in the back-and-forth directions in the digital camera according to the first embodiment depicted in FIG. 3.

Third Embodiment

Now, a digital camera according to a third embodiment of the present invention will be described with reference to FIGS. 10 and 11.

A most part of a configuration of the digital camera according to the third embodiment is the same as the most part of the configuration of the digital camera according to the first embodiment of the present invention mentioned above with reference to FIGS. 1 to 8.

Therefore, in the digital camera according to the third embodiment, the structural elements which are the same as those in the digital camera according to the first embodiment are denoted by the same reference numerals as those denoting the structural elements in the digital camera according to the first embodiment corresponding to the structural elements in the digital camera according to the third embodiment, thereby eliminating the detailed explanations of such structural elements.

Figure 10:
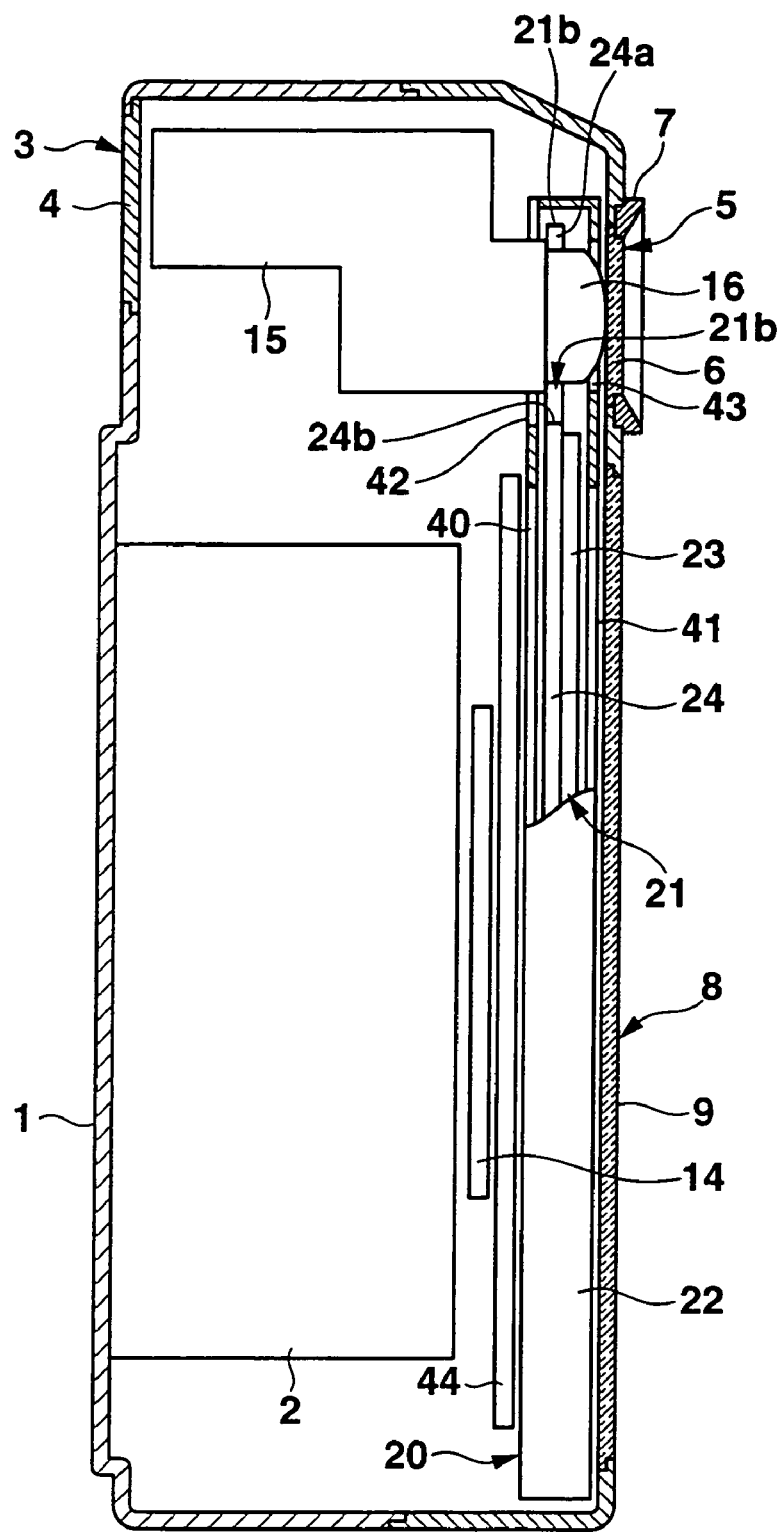
FIG. 10 is a cross-sectional view of a digital camera according to a third embodiment of the present invention.
Figure 11:
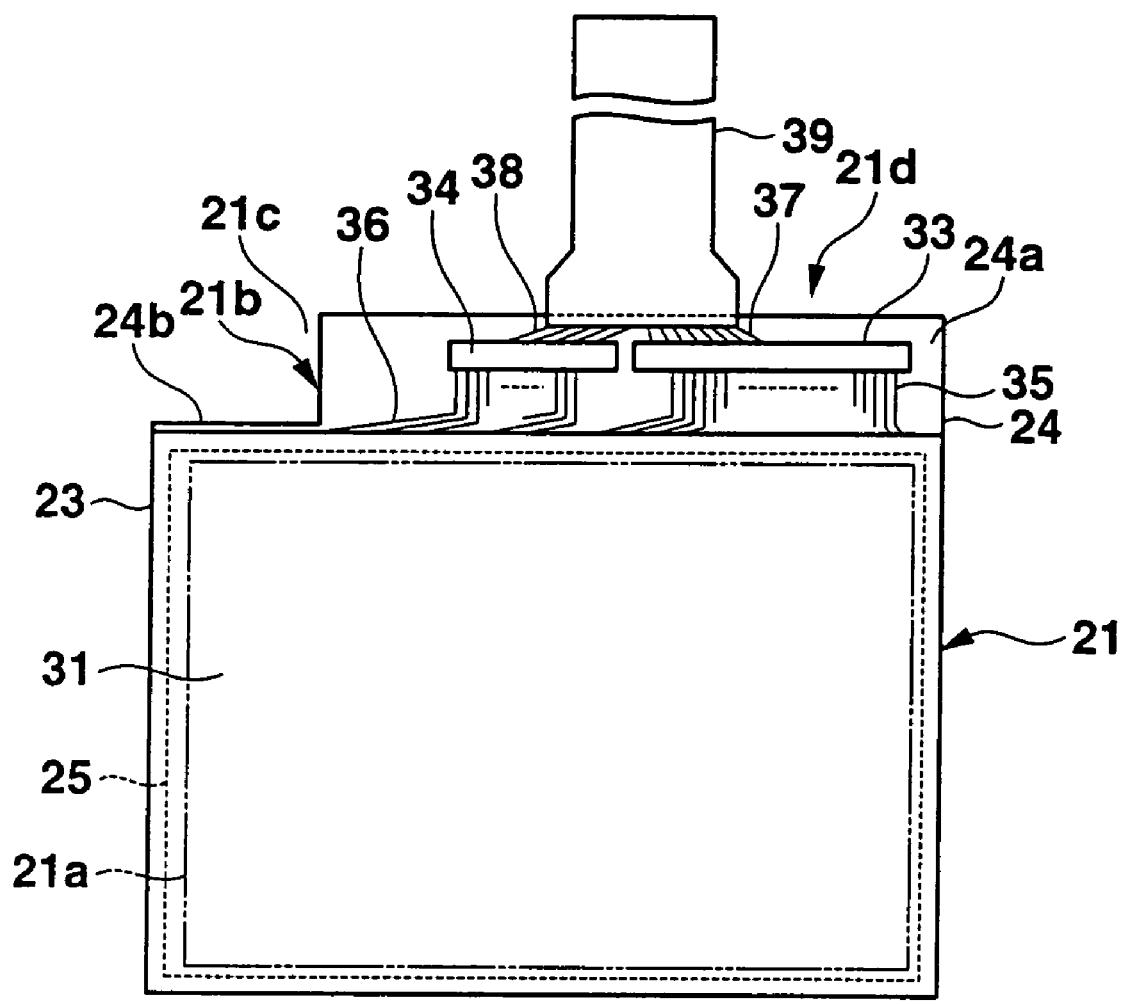
FIG. 11 is a rear view of a display panel of an image display apparatus used in the digital camera shown in FIG. 10.

A cross section of the digital camera according to the third embodiment shown in FIG. 10 corresponds to the cross section of the digital camera according to the first embodiment shown in FIG. 3. And, a rear surface of the display panel 21 of the digital camera according to the third embodiment shown in FIG. 11 corresponds to the rear surface of the display panel 21 of the digital camera according to the first embodiment depicted in FIG. 7.

The digital camera according to the third embodiment is different from the digital camera according to the first embodiment in the structure of the lookout enabling portion 21c provided in the predetermined part of the projection 21b of the display panel 21 of the image display apparatus 20. The lookout enabling portion 21c of this embodiment includes an opening 24b formed at the predetermined part of the upper edge portion 24a of one transparent substrate 24 providing the projection 21b of the display panel 21.

As a result, when the image display apparatus 20 is arranged in the internal space of the camera main body 1 to overlap the lookout enabling portion 21c at the predetermined part of the projection 21b of the display panel 21 with the finder optical system 15 included in the optical finder, the opening 24b formed at the predetermined part of the upper edge portion 24a of one transparent substrate 24 providing the projection 21b of the display panel 21 is positioned near to the eyepiece window 5 on the rear surface of the camera main body 1, and the other end 16 of the finder optical system 15 included in the optical finder is inserted into the opening 24b as the lookout enabling portion 21c at the predetermined part of the upper edge portion 24a of one transparent substrate 24 of the display panel 21.

This means that, as shown in FIG. 10, the other end 16 of the finder optical system 15 inserted into the lookout enabling portion opening 42 in the front surface of the panel case 22 accommodating the display panel 21 therein can be arranged more closely to the eyepiece window 5 in the rear surface of the camera main body 1 through the opening 24b at the predetermined part of the upper edge portion 24a of one transparent substrate 24 of the display panel 21 and the lookout enabling portion opening 43 in the rear surface of the panel case 22.

Therefore, this also means that a dimension (a thickness) of the camera main body 1 in the back-and-forth directions in the digital camera according to the third embodiment shown in FIG. 10 can be reduced by at least an amount of a total of a dimension (thickness) of each of the pair of transparent substrates 23, 24 in the back-and-forth directions of the display panel 21 in the panel case 22 and a dimension (depth) of the lookout enabling portion opening 43 in the back-and-forth directions in the rear surface of the panel case 22, as compared with the dimension (thickness) of the camera main body 1 in the back-and-forth directions in the digital camera according to the first embodiment depicted in FIG. 3.

Fourth Embodiment

Now, a digital camera according to a fourth embodiment of the present invention will be described with reference to FIGS. 12 to 16.

A most part of a configuration of the digital camera according to the fourth embodiment is the same as the most part of the configuration of the digital camera according to the first embodiment of the present invention mentioned above with reference to FIGS. 1 to 8.

Therefore, in the digital camera according to the fourth embodiment, the structural elements which are the same as those in the digital camera according to the first embodiment are denoted by the same reference numerals as those denoting the structural elements in the digital camera according to the first embodiment corresponding to the structural elements in the digital camera according to the fourth embodiment, thereby eliminating the detailed explanations of such structural elements.

Figure 13:
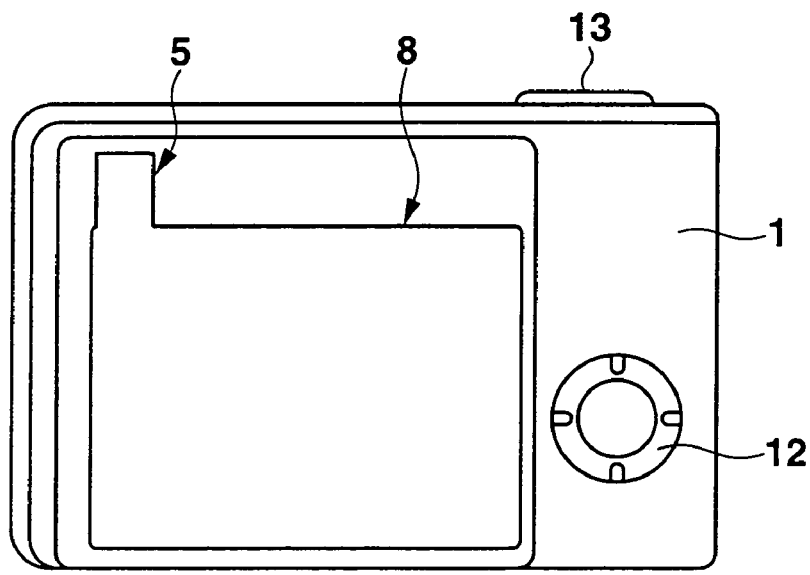
FIG. 13 is a view showing a rear surface of the digital camera shown in FIG. 12 in a state where an image display window frame member surrounding an image display window and an eyepiece window frame member surrounding an eyepiece window are removed.
Figure 14:
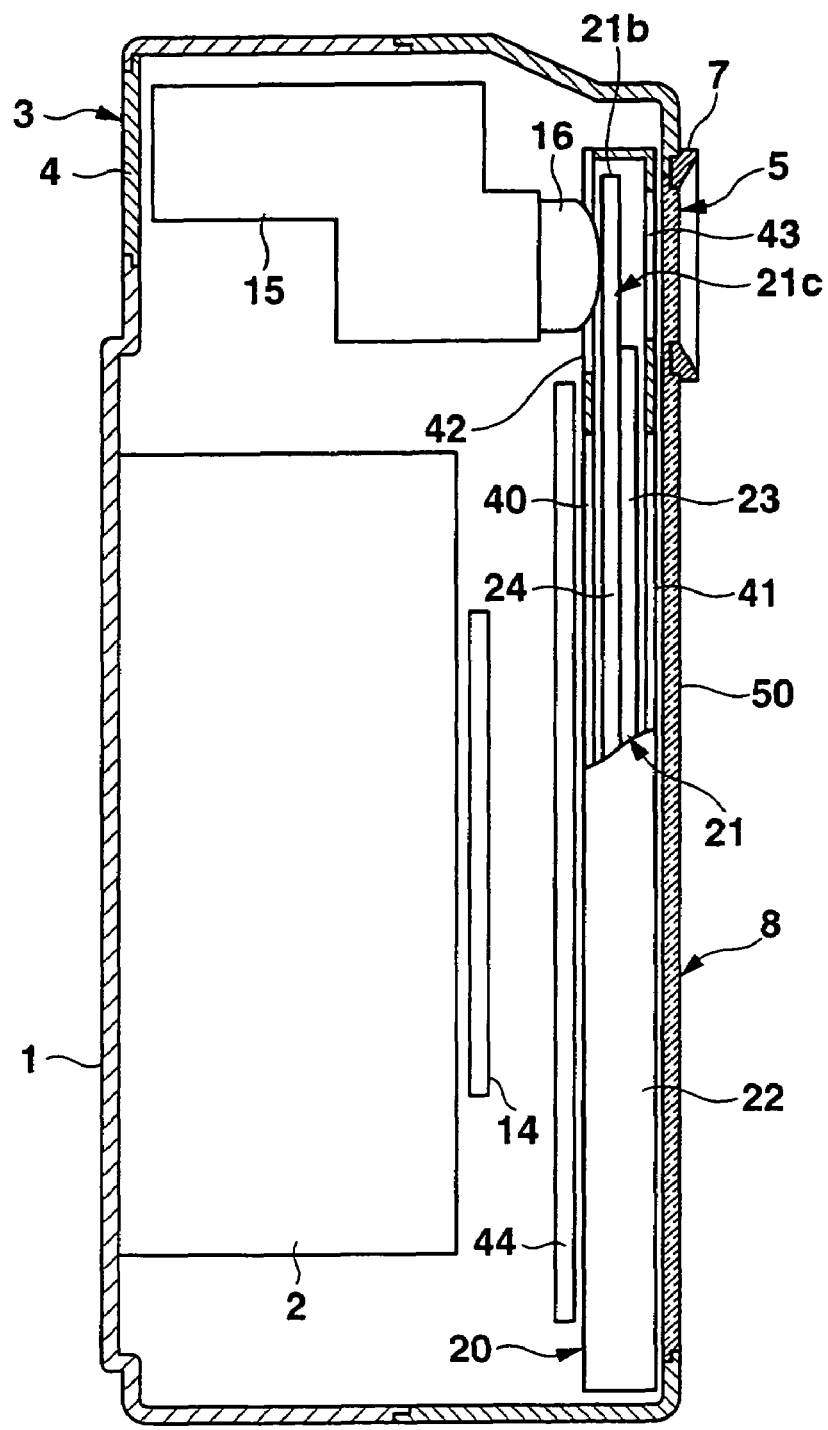
FIG. 14 is a cross-sectional view taken along a line XIV-XIV in FIG. 12.

A difference of the digital camera according to the fourth embodiment from the digital camera according to the first embodiment lies in that the eyepiece window 5 and the image display window 8 both of which are formed in the rear surface of the camera main body 1 communicates with each other, as shown in FIG. 13. More precisely, the lower edge of the eyepiece window 5 communicates with a part of the upper edge of the image display window 8 in the rear surface of the camera main body 1. And, the eyepiece window 5 and the image display window 8 communicating with each other as described above are covered with one common transparent cover member 50.

By forming the eyepiece window 5 and the image display window 8 in the rear surface of the camera main body 1 to communicate with each other as described above, a manufacturing cost required to form the eyepiece window 5 and the image display window 8 in the rear surface of the camera main body 1 can be reduced as compared with a case in which the eyepiece window 5 and the image display window 8 are independently formed.

Figure 15:
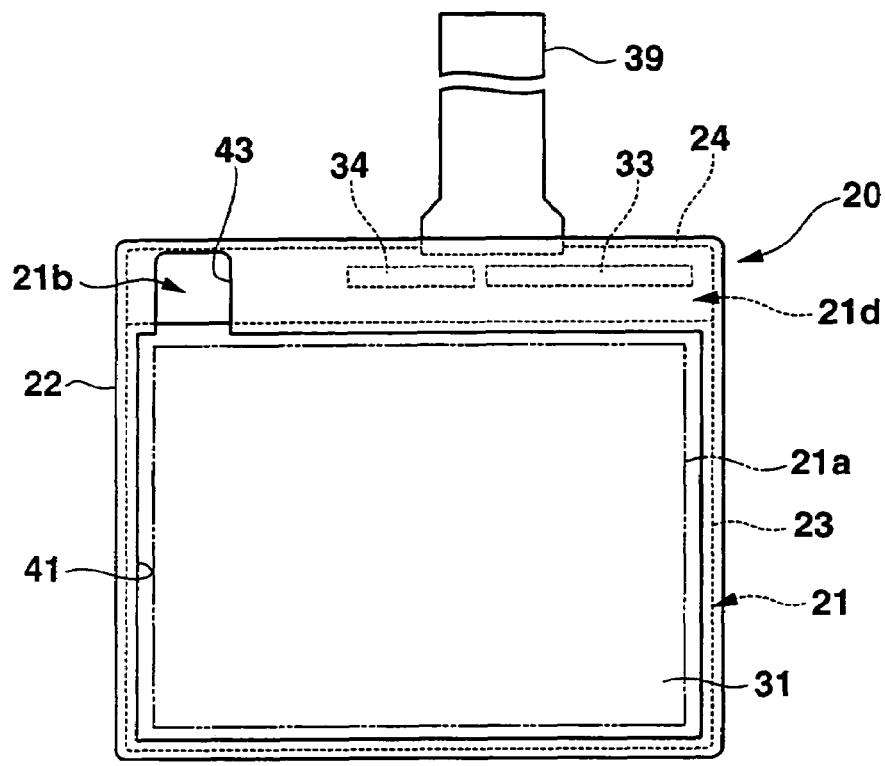
FIG. 15 is a rear view of a display panel of an image display apparatus used in the digital camera shown in FIG. 12.

Further, in the digital camera according to the fourth embodiment, as shown in FIG. 15, the lookout enabling portion opening 43 and the display area opening 41 are formed in the rear surface of the panel case 22 to communicate with each other. More precisely, the lower edge of the lookout enabling portion opening 43 communicates with a part of the upper edge of the display area opening 41 in the rear surface of the panel case 22.

By forming the lookout enabling portion opening 43 and the display area opening 41 to communicate with each other in the rear surface of the panel case 22 as described above, a manufacturing cost required to form the lookout enabling portion opening 43 and the display area opening 41 in the rear surface of the panel case 22 can be reduced as compared with a case in which the lookout enabling portion opening 43 and the display area opening 41 are independently formed.

Figure 16:
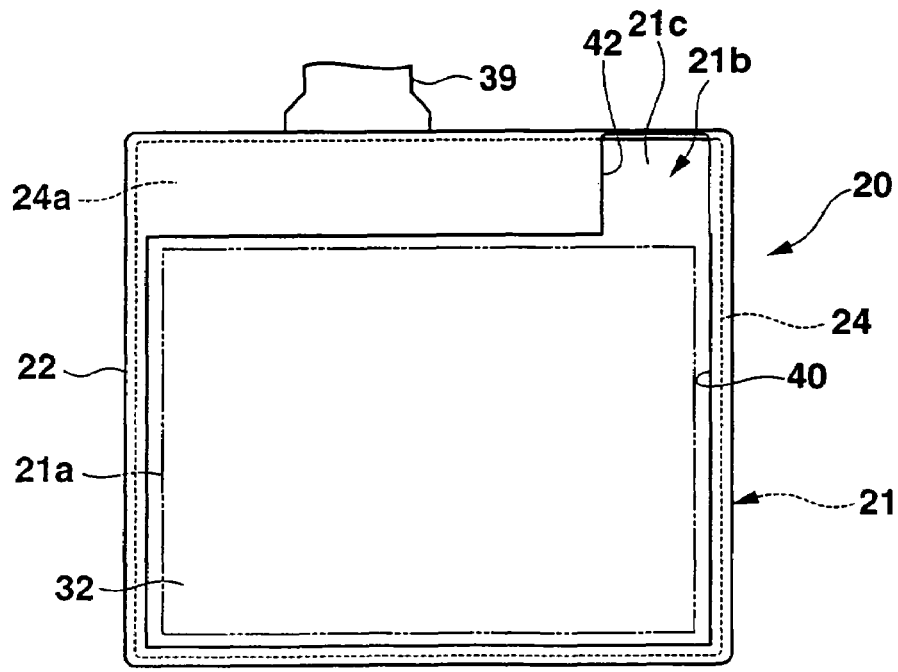
FIG. 16 is a front view of the display panel shown in FIG. 15.

Furthermore, in the digital camera according to the fourth embodiment, as shown in FIG. 16, the lookout enabling portion opening 42 and the light receiving opening 40 are formed in the front surface of the panel case 22 to communicate with each other. More precisely, the lower edge of the lookout enabling portion opening 42 communicates with a part of the upper edge of the light receiving opening 40.

By forming the lookout enabling portion opening 42 and the light receiving opening 40 in the front surface of the panel case 22 to communicate with each other as described above, a manufacturing cost required to form the lookout enabling portion opening 42 and the light receiving opening 40 to communicate with each other in the front surface of the panel case 22 can be reduced as compared with a case in which the lookout enabling portion opening 42 and the light receiving opening 40 are independently formed.

Figure 12:
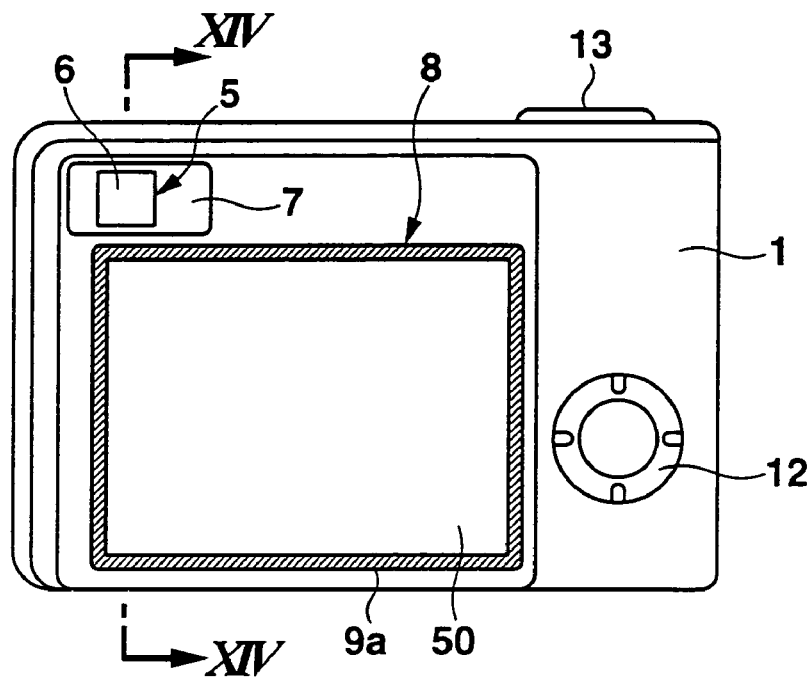
FIG. 12 is a rear view of a digital camera according to a fourth embodiment of the present invention.

Furthermore, in the digital camera according to the fourth embodiment, as shown in FIG. 12, a width dimension of a part of the eyepiece window frame member 7 adjacent to the image display window 8 is set to fall within a range of a width dimension of a part of the image display window frame member 9a adjacent to the eyepiece window 5. And, the part of the eyepiece window frame member 7 adjacent to the image display window overlaps with the part of the image display window frame member 9a adjacent to the eyepiece window 5 within the range of the width dimension of the part of the image display window frame member 9a adjacent to the part of the eyepiece window.

More precisely, a dimension of the part of the eyepiece window frame member 7, corresponding to the lower edge of the eyepiece window 5, in the up-and-down directions is set to fall within a range of a dimension of the part of the upper edge of the image display window frame member 9a, corresponding to the lower edge of the eyepiece window 5, in the up-and-down directions.

Therefore, the part of the eyepiece window frame member 7 corresponding to the lower edge of the eyepiece window 5 overlaps with the part of the image display window frame member 9a corresponding to the lower edge of the eyepiece window 5 in the range of the width of the part of the image display window frame member 9a, corresponding to the lower edge of the eyepiece window 5, in the up-and-down directions. This guarantees that the part of the eyepiece window frame member 7 corresponding to the lower edge corresponding to the lower edge of the eyepiece window 5 does not protrude into the image display window 8 beyond the part of the image display window frame member 9a corresponding to the lower edge of the eyepiece window 5.

[Various Modifications]

The configuration of the display panel 21 accommodated in the panel case 22 and the arrangement of the display panel 21 in the panel case 22 in the fourth embodiment described with reference to FIGS. 12 to 16 are the same as those in the first embodiment described with reference to FIGS. 1 to 8. However, the configuration and the arrangement may be either those in the second embodiment described with reference to FIG. 9 or those in the third embodiment described with reference to with FIGS. 10 and 11.

The display panel 21 of the image display apparatus 20 in each of the first to fourth embodiments is accommodated in the panel case 22, but the panel case 22 can be eliminated.

In each of the first to fourth embodiments, the finder optical system 15 of the optical finder is arranged at the upper end portion of the internal space of the camera main body 1, the finder object window 3 is formed in the upper end portion of the front surface of the camera main body 1, and the eyepiece window 5 is formed in the upper end portion in the rear surface of the camera main body 1. However, the finder optical system 15 of the optical finder may be arranged at one of the edge portions (including the upper end portion, the lower end portion, and the right and left end portions) in the internal space of the camera main body 1.

Therefore, in accordance with the arrangement of the finder optical system 15 in the internal space of the camera main body 1, the finder object window 3 may be formed at one of edge portions (including the upper end portion, the lower end portion, and the right and left end portions) in the front surface of the camera main body 1 and the eyepiece window 5 may be formed at one of the edge portions (including the upper end portion, the lower end portion, and the right and left end portions) in the rear surface of the camera main body 1. For example, in a case that the finder optical system 15 is arranged at one of the right and left end portions in the internal space of the camera main body 1, the projection 21b of the image display panel 21 of the image display apparatus 20 is arranged at one of the right and left end portions in the internal space in accordance with the arrangement of the finder optical system 15 in the internal space, and the lookout enabling portion 21c of the projection 21b is overlapped with the finder optical system 15.

When this case is compared with another case in which the projection 21b of the display panel 21 of the image display apparatus 20 does not have the lookout enabling portion 21c, a dimension (a width) of the display area 21a of the display panel 21 in the right-and-left directions can be set more large in the internal space of the camera main body 1, and hence a dimension (a width) of the image display window 8 in the right-and-left directions can be formed more large in the rear surface of the camera main body 1.

Further, the eyepiece window 5 which is arranged at one of the edge portions (including the upper end portion, the lower end portion, and the right and left end portions) in the rear surface of the camera main body 1 to adjoin the image display window 8 in accordance with the arrangement of the finder optical system 15 in the internal space of the camera main body 1 can be formed to communicate with the image display window 8.

In this case, it is preferable to set a width dimension of the part of the eyepiece window frame member 7 of the eyepiece window 5 adjacent to the image display window 8 to fall within a range of a width dimension of the part of the light shielding mask of the image display window frame member 9a of the image display window 8 adjacent to the part of the eyepiece window frame member 7 of the eyepiece window 5 adjacent to the image display window 8, and to overlap the part of the eyepiece window frame member 7 of the eyepiece window 5 adjacent to the image display window 8 with the part of the light shielding mask of the image display window frame member 9a of the image display window 8 adjacent to the eyepiece window 5 within the range of the width dimension of the light shielding mask of the image display window frame member 9a of the image display window 8 adjacent to the eyepiece window 5. As a result, the part of the eyepiece window frame member 7 of the eyepiece window 5 adjacent to the image display window 8 does not project into the image display window 8 beyond the part of the light shielding mask of the image display window frame member 9a adjacent to the eyepiece window 5, and it is possible to prevent viewing of the display area 21a of the display panel 21 of the image display apparatus 20 which is exposed in the image display window 8 from being deteriorated.

Moreover, in each of the first to fourth embodiments, the display panel 21 of the image display apparatus 20 includes the projection 21b to which the lookout enabling portion 21c and the pixel drive unit 21d are provided and which projects upward from the display area 21a. However, the display panel 21 includes any other projection which projects in one or all of a downward direction and right-and-left directions, a part of the pixel drive unit 21d or any other electric and/or electronic circuits may be set on such a projection.

At a part of the projection 21b excluding the lookout enabling portion 21c, only a part of the pixel drive unit 21d may be provided or other various electric and/or electronic circuits other than the pixel drive unit 21d can be set.

Additionally, in each of the first to fourth embodiments, although the display panel 21 of the image display apparatus 20 is the active matrix drive type liquid crystal display panel, it can be any other drive type liquid crystal display panel. Alternatively, any kind of display panel other than the liquid crystal display panel may be used as long as the display panel of the image display apparatus comprises a display area in which a plurality of pixels are arranged in a matrix and a projection which projects outward from at least a part of an outer periphery of the display area, a lookout enabling portion is arranged at a predetermined part of the projection, and a pixel drive unit is provided at the remaining part of the projection. In such a case, if a self light emitting type display panel is used, the surface light emitting unit 44 can be eliminated from the internal space of the camera main body 1.

Further, the imaging lens 2 may be a single-focus lens which can not move a focal distance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image display apparatus which is provided in a camera main body of a digital camera, the camera main body having an optical finder, to display an image taken by the digital camera, the image display apparatus comprising a display panel including:

a display area in which a plurality of pixels are arranged in a matrix;

a projection which projects outwardly from at least a part of an outer periphery of the display area;

a lookout enabling portion which is arranged at a predetermined part of the projection and enables lookout from one of both sides of the projection to the other side; and a pixel drive unit which is arranged at the remaining part of the projection, wherein, when the image display apparatus is provided in the camera main body, the lookout enabling portion at the predetermined part of the projection of the display panel overlaps with the optical finder, and the pixel drive unit at the remaining part of the projection is arranged in a side of the optical finder.

2. The image display apparatus according to claim 1, wherein the lookout enabling portion of the projection of the display panel includes one of a transparent material and an opening.

3. The image display apparatus according to claim 1, wherein the display panel is a liquid crystal display panel, the liquid crystal display panel includes: a pair of transparent substrates arranged to face each other; a frame-like sealing member which surrounds and seals a gap between the pair of transparent substrates to correspond to an outer periphery of the display area; a liquid crystal layer which is provided in a sealed area surrounded by the frame-like sealing member corresponding to the outer periphery of the display area in the gap between the pair of transparent substrates; and a plurality of electrodes which are arranged at parts on inner surfaces of the pair of transparent substrates corresponding to the display area to face each other and to operate liquid crystals therebetween as a plurality of pixels arranged in a matrix, a part of one of the pair of transparent substrates projects outwardly from at least a part of the outer periphery of the display area and the outwardly projecting part of one transparent substrate provides the projection, and the lookout enabling portion at the predetermined part of the projection includes one of a material of the predetermined part of one transparent substrate providing the projection and an opening formed at the predetermined part.

4. The image display apparatus according to claim 1, further comprising a panel case accommodating the display panel therein, wherein the panel case includes: a display area opening which corresponds to the display area of the display panel and through which the display area is exposed; and a lookout enabling portion opening which corresponds to the lookout enabling portion of the projection of the display panel and through which the lookout enabling portion is exposed.

5. The image display apparatus according to claim 4, wherein the display panel is a liquid crystal display panel, the liquid crystal display panel includes: a pair of transparent substrates arranged to face each other; a frame-like sealing member which surrounds and seals a gap between the pair of transparent substrates to correspond to an outer periphery of the display area; a liquid crystal layer which is provided in a sealed area surrounded by the frame-like sealing member corresponding to the outer periphery of the display area in the gap between the pair of transparent substrates; and a plurality of electrodes which are arranged at parts on inner surfaces of the pair of transparent substrates corresponding to the display area to face each other and to operate liquid crystals therebetween as a plurality of pixels arranged in a matrix, a part of one of the pair of transparent substrates projects outwardly from at least a part of the outer periphery of the display area and the outwardly projecting part of one transparent substrate provides the projection, and the lookout enabling portion at the predetermined part of the projection includes one of a material of the predetermined part of one transparent substrate providing the projection and an opening formed at the predetermined part.

6. A digital camera comprising:

a camera main body which has a front surface, a rear surface, an edge portion, and an image display window formed on the rear surface;

an imaging unit which is provided in the camera main body and electrically takes an image;

an optical finder which is provided at the edge portion of the camera main body; and an image display apparatus which is provided in the camera main body and displays an image taken by the imaging unit, wherein the image display apparatus includes a display panel including:

a display area which is arranged nearer to the rear surface than the imaging unit in the camera main body and in which a plurality of pixels are arranged in a matrix;

a projection which projects outwardly from at least a part of an outer periphery of the display area;

a lookout enabling portion which is arranged at a predetermined part of the projection and enables lookout from one of both sides of the projection to the other side; and a pixel drive unit which is arranged at the remaining part of the projection, and when the image display apparatus is arranged in the camera main body, the display area of the display panel corresponds to the image display window, the lookout enabling portion at the predetermined part of the projection of the display panel overlaps with the optical finder, and the pixel drive unit at the remaining part of the projection is arranged in a side of the optical finder.

7. The digital camera according to claim 6, wherein the lookout enabling portion of the projection of the display panel of the image display apparatus includes one of a transparent material and an opening.

8. The digital camera according to claim 7, wherein the display panel of the image display apparatus is a liquid crystal display panel, the liquid crystal display panel includes: a pair of transparent substrates arranged to face each other; a frame-like sealing member which surrounds and seals a gap between the pair of transparent substrates to correspond to an outer periphery of the display area; a liquid crystal layer which is provided in a sealed area surrounded by the frame-like sealing member corresponding to the outer periphery of the display area in the gap between the pair of transparent substrates; and a plurality of electrodes which are arranged at parts on inner surfaces of the pair of transparent substrates corresponding to the display area to face each other and to operate liquid crystals therebetween as a plurality of pixels arranged in a matrix, a part of one of the pair of transparent substrates projects outwardly from at least a part of the outer periphery of the display area and the outwardly projecting part of one transparent substrate provides the projection, and the lookout enabling portion at the predetermined part of the projection includes one of a material of the predetermined part of one transparent substrate providing the projection and an opening formed at the predetermined part.

9. The digital camera according to claim 6, wherein a finder object window is formed at the edge portion in the front surface of the camera main body, an eyepiece window is formed at the edge portion in the rear surface of the camera main body, the optical finder includes a finder optical system having one end facing the finder object window and the other end facing the eyepiece window, the lookout enabling portion of the projection of the display panel of the image display apparatus includes a transparent material, and the lookout enabling portion including the transparent material is interposed between the eyepiece window at the edge portion in the rear surface of the camera main body and the other end of the optical finder facing the eyepiece window.

10. The digital camera according to claim 9, wherein the display panel of the image display apparatus is a liquid crystal display panel, the liquid crystal display panel includes: a pair of transparent substrates arranged to face each other; a frame-like sealing member which surrounds and seals a gap between the pair of transparent substrates to correspond to an outer periphery of the display area; a liquid crystal layer which is provided in a sealed area surrounded by the frame-like sealing member corresponding to the outer periphery of the display area in the gap between the pair of transparent substrates; and a plurality of electrodes which are arranged at parts on inner surfaces of the pair of transparent substrates corresponding to the display area to face each other and to operate liquid crystals therebetween as a plurality of pixels arranged in a matrix, a part of one of the pair of transparent substrates projects outwardly from at least a part of the outer periphery of the display area and the outwardly projecting part of one transparent substrate provides the projection, and the lookout enabling portion at the predetermined part of the projection includes a material of the predetermined part of one transparent substrate providing the projection.

11. The digital camera according to claim 6, wherein a finder object window is formed at the edge portion in the front surface of the camera main body, an eyepiece window is formed at the edge portion in the rear surface of the camera main body, the optical finder includes a finder optical system having one end facing the finder object window and the other end facing the eyepiece window, the lookout enabling portion of the projection of the display panel of the image display apparatus includes an opening, and the other end of the optical finder facing the eyepiece window at the edge portion in the rear surface of the camera main body is inserted into the opening of the lookout enabling portion of the projection of the display panel.

12. The digital camera according to claim 11, wherein the display panel of the image display apparatus is a liquid crystal display panel, the liquid crystal display panel includes: a pair of transparent substrates arranged to face each other; a frame-like sealing member which surrounds and seals a gap between the pair of transparent substrates to correspond to an outer periphery of the display area; a liquid crystal layer which is provided in a sealed area surrounded by the frame-like sealing member corresponding to the outer periphery of the display area in the gap between the pair of transparent substrates; and a plurality of electrodes which are arranged at parts on inner surfaces of the pair of transparent substrates corresponding to the display area to face each other and to operate liquid crystals therebetween as a plurality of pixels arranged in a matrix, a part of one of the pair of transparent substrates projects outwardly from at least a part of the outer periphery of the display area and the outwardly projecting part of one transparent substrate provides the projection, and the lookout enabling portion at the predetermined part of the projection includes an opening formed at the predetermined part of one transparent substrate providing the projection.

13. The digital camera according to claim 6 further comprising a panel case accommodating the display panel therein, wherein the panel case includes: a display area opening which corresponds to the display area of the display panel and through which the display area is exposed; and a lookout enabling portion opening which corresponds to the lookout enabling portion of the projection of the display panel and through which the lookout enabling portion is exposed.

14. The digital camera according to claim 13, wherein a finder object window is formed at the edge portion in the front surface of the camera main body, an eyepiece window is formed at the edge portion in the rear surface of the camera main body, the optical finder includes a finder optical system having one end facing the finder object window and the other end facing the eyepiece window, the lookout enabling portion opening of the panel case is interposed between the eyepiece window in the rear surface of the camera main body and the other end of the finder optical system in the camera main body, and the other end of the finder optical system is inserted into a part of the lookout enabling portion opening of the panel case facing the other end.

15. The digital camera according to claim 14, wherein the lookout enabling portion of the projection of the display panel of the image display apparatus includes a transparent material, and the lookout enabling portion including the transparent material is interposed between the eyepiece window at the edge portion in the rear surface of the camera main body and the other end of the optical finder facing the eyepiece window.

16. The digital camera according to claim 15, wherein the display panel of the image display apparatus is a liquid crystal display panel, the liquid crystal display panel includes: a pair of transparent substrates arranged to face each other; a frame-like sealing member which surrounds and seals a gap between the pair of transparent substrates to correspond to an outer periphery of the display area; a liquid crystal layer which is provided in a sealed area surrounded by the frame-like sealing member corresponding to the outer periphery of the display area in the gap between the pair of transparent substrates; and a plurality of electrodes which are arranged at parts on inner surfaces of the pair of transparent substrates corresponding to the display area to face each other and to operate liquid crystals therebetween as a plurality of pixels arranged in a matrix, a part of one of the pair of transparent substrates projects outwardly from at least a part of the outer periphery of the display area and the outwardly projecting part of one transparent substrate provides the projection, and the lookout enabling portion at the predetermined part of the projection includes a material of the predetermined part of one transparent substrate providing the projection.

17. The digital camera according to claim 14, wherein the lookout enabling portion of the projection of the display panel of the image display apparatus includes an opening, and the other end of the optical finder is inserted into the opening of the lookout enabling portion of the projection of the display panel through the lookout enabling portion opening of the panel case.

18. The digital camera according to claim 17, wherein the display panel of the image display apparatus is a liquid crystal display panel, the liquid crystal display panel includes: a pair of transparent substrates arranged to face each other; a frame-like sealing member which surrounds and seals a gap between the pair of transparent substrates to correspond to an outer periphery of the display area; a liquid crystal layer which is provided in a sealed area surrounded by the frame-like sealing member corresponding to the outer periphery of the display area in the gap between the pair of transparent substrates; and a plurality of electrodes which are arranged at parts on inner surfaces of the pair of transparent substrates corresponding to the display area to face each other and to operate liquid crystals therebetween as a plurality of pixels arranged in a matrix, a part of one of the pair of transparent substrates projects outwardly from at least a part of the outer periphery of the display area and the outwardly projecting part of one transparent substrate provides the projection, and the lookout enabling portion at the predetermined part of the projection includes an opening formed at the predetermined part of one transparent substrate providing the projection.

19. The digital camera according to claim 6, wherein a finder object window is formed at the edge portion in the front surface of the camera main body, an eyepiece window is formed at the edge portion in the rear surface of the camera main body so that the eyepiece window is arranged adjacent to the image display window and communicates with the image display window, the optical finder includes a finder optical system having one end facing the finder object window and the other end facing the eyepiece window, one transparent plate is fitted in the eyepiece window and image display window which communicate with each other in the rear surface of the camera main body, a frame-like light shielding mask corresponding to a peripheral edge of the image display window is provided on the transparent plate, and a window frame member surrounding the eyepiece window is provided on the rear surface of the camera main body.

20. The digital camera according to claim 19, wherein a width dimension of a part of the window frame member of the eyepiece window adjacent to the image display window is set to fall within a range of a width dimension of a part of the light shielding mask of the image display window adjacent to the part of the window frame member of the eyepiece window adjacent to the image display window, and the part of the window frame member of the eyepiece window adjacent to the image display window is overlapped with the part of the light shielding mask of the image display window adjacent to the part of the window frame member of the eyepiece window within the range of the width dimension of the part of the light shielding mask of the image display window adjacent to the part of the window frame member of the eyepiece window adjacent to the image display window.

* * * * *